United States Patent [19]

Nagakura

[11] 3,937,900
[45] Feb. 10, 1976

[54] LONG DISTANCE TELEPHONE CALL LIMITING DEVICE

[76] Inventor: Masayuki Nagakura, c/o Azabu Second Corporation 27-10, 3-chome, Tokyo, Japan

[22] Filed: Aug. 27, 1974

[21] Appl. No.: 500,859

[30] Foreign Application Priority Data
May 25, 1974  Japan.............................. 49-058951

[52] U.S. Cl............................ 179/90 D; 179/189 D
[51] Int. Cl.².......................................... H04M 1/66
[58] Field of Search.......... 179/90 D, 90 R, 18 DA, 179/6.3 R, 189, 189 D, 14

[56] References Cited
UNITED STATES PATENTS

| | | | |
|---|---|---|---|
| 3,511,939 | 5/1970 | Aikawa............................. | 179/90 D |
| 3,555,209 | 1/1971 | Ireland............................ | 179/189 D |
| 3,681,532 | 8/1972 | Simon.............................. | 179/90 D |

*Primary Examiner*—William C. Cooper
*Assistant Examiner*—Gerald L. Brigance
*Attorney, Agent, or Firm*—Armstrong, Nikaido & Wegner

[57] ABSTRACT

A long distance telephone call limiting device is provided which prevents the dialing of a long distance telephone number. The device comprises a stopper mounted on the dial ring at the 0 position. The stopper engages an arrangement of cams and levers when an 0 or 1 is dialed as either the first or second digits in a telephone number. The engagement prevents the further dialing of the number. The device is reset by the placement of the handset into the cradle.

4 Claims, 5 Drawing Figures

LONG DISTANCE TELEPHONE CALL LIMITING DEVICE

BACKGROUND OF THE INVENTION

1. Field of the Invention

The present invention relates to a long distance telephone call limiting device capable of preventing the user of an ordinary dial type telephone from making long distance telephone calls without permission of the owner.

2. Description of the Prior Art

The long distance telephone service in the United States and its surrounding area are conducted according to the following system:

The entire service area is divided into telephone areas to which a three digit area code is assigned. This area code is put before a 7 digit individual number, thus constituting an individual telephone number. Of course, within a local call area no area code is required. The manner of combination of the above mentioned area codes and that of the first three figures of 7 digit individual numbers are fundamentally different from one another. For example, the figure in the middle of three digits of each area code is 0 or 1 such as, for example, 205, 712 but the figure in the middle of the first three figures of each 7 digit personal number is never to be 0 or 1, such as, for example, 245, 837, etc.

Thus, it is concluded from the above mentioned telephone number composition that there are three areas for making long distance calls, namely:

1. An area where an area code plus an individual number are dialed.
2. An area where the dial numeral 1 (a long distance call number) and then an area code and an individual number are dialed.
3. An area where 0 is dialed for calling an operator and telling her the area code and individual number desired.

In summation, in order to make long distance calls in the above mentioned areas, one must dial 0 or 1 in the first order, or 0 or 1 in the second order without exception, and this is not applicable to local calls. Accordingly, if a means is provided on the telephone which prevents the first digit 0 or 1, or the second digit 0 or 1 from being dialed initially it is possible to prevent any long distance telephone calls.

SUMMARY OF THE INVENTION

The present invention has been accomplished on the base of the above mentioned dialing mechanism and has the advantage of being installed simply and operated accurately so that abuse of long distance calls by others can be avoided.

Accordingly, it is an object of the present invention to provide a long distance telephone call limiting device comprising a dial preventing mechanism installed on a telephone set and operative relative to the rotation of the dial plate whereby an initial dialing of the dial numeral 0 or 1 which any long distance call includes is prevented.

Another object of the present invention is to provide a long distance telephone call limiting device comprising a dial preventing mechanism installed on a telephone set and operative relative to the rotation of the dial plate whereby a second dialing of the dial numeral 0 or 1 which any long distance call includes is prevented.

Still another object of the present invention is to provide a long distance telephone call limiting device which is simple and economical.

The present invention comprises a stopper provided on the periphery of the dial plate, a plurality of cam members integrally formed with one another, a rotation sensing lever for sensing the rotation of the dial plate, an arch-shaped 0-check lever, a hook lever, a set lever, a connecting rod operative relative to the on and off movements of a handset of a telephone, and a plurality of spring means, all of which interact directly or indirectly with one another to respond to specific dialing conditions thereby to prevent and control the making of any long distance calls.

BRIEF DESCRIPTION OF THE DRAWINGS

The present invention will now be explained in detail with reference to the accompanying drawing in which.

DESCRIPTION OF THE PREFERRED EMBODIMENT

Figure 1:
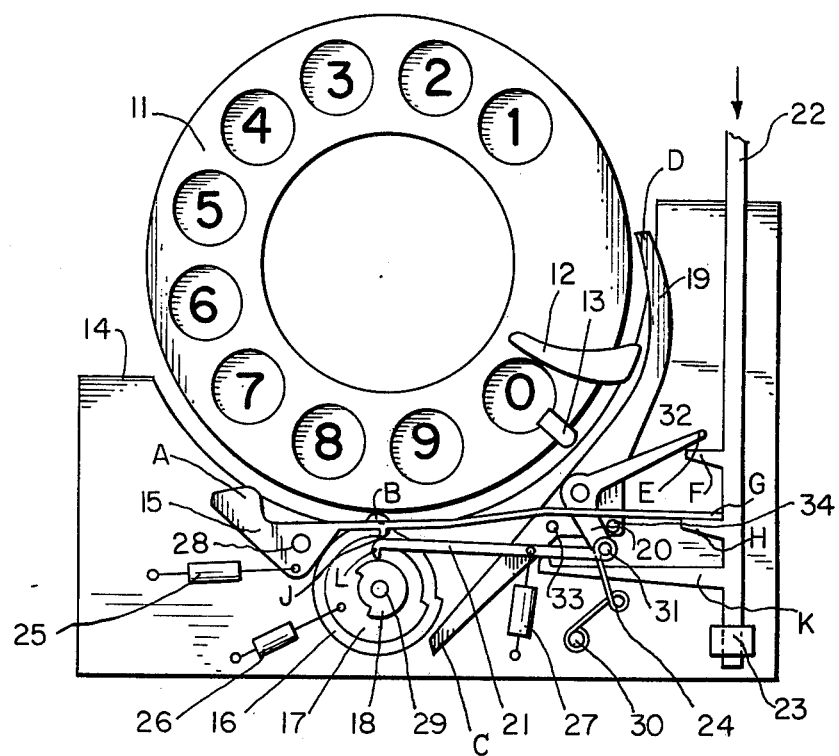
FIG. 1 shows a plan view of a telephone dial portion provided with the device according to the present invention.

Referring to FIG. 1, a dial plate 11 is provided on its outer periphery of the finger hole of the dial numeral 0 a stopper 13. A finger stop 12 is provided on a base plate 14, as in an ordinary type telephone dial. A cam 16 having a protrusion B is integral with upper cams 17 and 18. The cam 16 is pivotable at a pin 29 on the base plate 14 and is kept at its original position by means of a tension spring 26. Further, the cam 16 faces one end C of an arch-shaped 0-check lever 19 which is pivotably supported by a pin 32. The lever 19 checks the dial numeral 0 being dialed. The cam 17 faces a hook portion J of a rotatable sensing lever 15 which is pivotable at a pin 28 and is kept at its original position by means of a tension spring 25. The cam 18 faces a hook portion of a hook lever 21 which is pivotable at a pin 31 and is kept at its original position by means of a tension spring 27. A sickleshaped set lever 20 is pivotable at the pin 32 and one end thereof is connected to the hook lever 21 at the pin 31. On the 0-check lever 19 there is provided control pins 33 and 34 such that one end of the set lever 20, which is raised by a tension spring 24 located between the pins 31 and 32, swings to push the control pin 34. The end D of the check lever 19 extends to and is retained at, a position at which the stopper 13 of the outer periphery of the finger hole of the dial numeral 0 is checked. A connecting rod 22 moves up and down along a guide 23 depending on the movement of the handset (not shown) on and off the telephone. The connecting rod 22 has a plurality of hook portions E, H and K which engage the end E of the set lever 20, the end G of the rotation sensing lever 15 and the lower surface of the hook lever 21 respectively.

Figure 2:
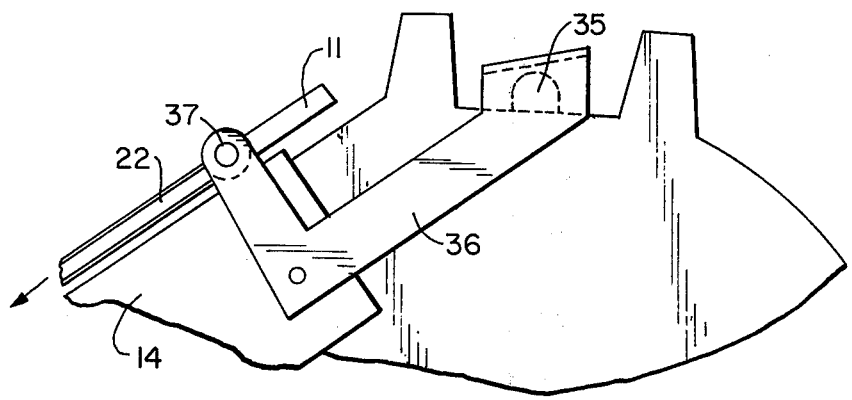
FIG. 2 shows a side view of a portion of same showing a link mechanism between a connecting rod and a switch lever of the device of the present invention.
Figure 3:
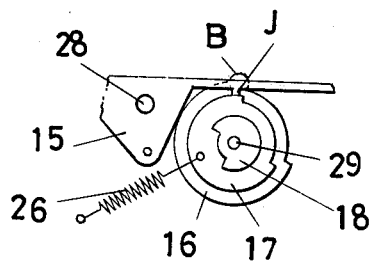
FIG. 3 is a plan view of a portion of the caming mechanism of the present invention.

Referring to FIG. 2, the connecting rod 22 is connected to a switch lever 36 by a pivot pin 37 so that when the handset is off the telephone the switch lever 36 is released to rise up together with a switch button 35 and the connecting rod moves downwardly in the direction of an arrow as shown. It should be noted in this connection that the FIG. 1 shows a condition of a mechanism of the present invention in which the hook portion F of the connecting rod 22 raises one end E of the set lever 20, the hook portion H raises one end G of the rotation sensing lever 15 and the hook portion K raises the hook lever 21, that is, a condition in which the handset is placed down on the telephone.

In operation, when the handset is off the telephone the connecting rod 22 is lowered but the set lever 20, the rotation sensing lever 15 and the hook lever 21 are retained at their original positions and then a sequence of dialing operations and the operation of the checking mechanism of the present invention follow.

1. When the dial numeral 0 is dialed initially

The stopper 13 pushes the protrusion B of the cam 16 in the counter-clockwise direction. In this case, the hook portion J of the rotating sensing lever 15 is locked into the recessed portion of the cam 17 by means of the spring means 25 whereupon the raised portion A at the other end of the said sensing lever 15 is raised and the stopper 13 pushes it down as it passes. The cam 16 returns to its original position by means of the spring means 26. The stopper 13 continues to rotate toward contact with the finger stop 12 but is obstructed by one end (D) of the 0-check lever 19. In other words, all the remaining dial numerals 2 to 9 can be dialed because they reach the finger stop 12 but the dial numeral 0 cannot be dialed.

2. When the dial numeral 1 is dialed initially

When the dial numeral 1 is dialed by 60°, it is at a position immediately adjacent the finger stop 12. In this case, the stopper 13 passes the cam 16 by pushing the protrusion B of the latter in the counter-clockwise direction and reaches a position where the dial numeral 8 was originally positioned. At this time, the protrusion B of the cam 16 is disengaged from the stopper 13 and tends to return to its original position but is retained at a position a little short of its original position since the hook portion J of the rotation sensing lever 15 is locked into the recessed portion of the cam 17. Accordingly, the return movement of the dial plate 11 is checked due to an engagement of the stopper 13 with the protrusion B of the cam 16 and no signal whatever is dispatched and further dialing is checked. Of course, when the handset is placed down on the telephone, the connecting rod 22 is raised. Since the hook portion H thereof raises up one end G of the rotation sensing lever 15, the hook portion J of the said lever 15 and the recessed portion of the cam 17 are disengaged from each other to make the protrusion B of the cam 16 to return to its original position and the stopper 13 returns to its original position. In this case, as the hook lever 21 is retained at its original position by means of the hook portion K of the connecting rod 22 it does not engage the cam 18 and the 0-check lever 19, for checking the dial numeral 0, is retained at its original position by means of the force spring 24 without engaging the recessed portion of the cam 16, thus allowing the cam 16 to return to its original position.

Thus, it is apparent that any telephone call starting with the dial numeral 1 or 0 cannot be made with a telephone provided with the device according to the present invention.

On the other hand, in case where any one of the other dial numerals 2 to 9 come initially, dialing is made without any obstruction and as described above, the dial plate 11 begins to assume a return movement as follows:

The stopper 13 pushes down the rotation sensing lever 15 first and then pushes away the protrusion B of the cam 16 in the clockwise direction. The cam 16 tends to return to its original position after the stopper 13 of the dial plate 11 has passed but remain midway between the position which the cam 16 can reach in the full counter-clockwise direction and its original position since the hook portion L of the hook lever 21 is locked into the recessed portion of the cam 18.

3. When the dial numeral 0 is dialed second

The stopper 13 pushes the protrusion B of the cam 16 in the counter-clockwise direction. Accordingly the hook lever 21 which has been locked into the recession portion of the cam 18 is drawn to the left and the one end of the set lever 20 opposite the end E, which has been retained at its original position by means of the tension spring 24, moves, due to a snap action, to a position adjacent the control pin 33 on the 0-check lever 19 and at the same time the end C of the 0-check lever 19 is forced to abut against the cam 16, with the other end D of the lever 19 still being in a position to check the advance movement of the stopper 13 from reaching the finger stop 12. Thus, the dial numeral 0 cannot be dialed to the full.

4. When the dial numeral 1 is dialed second

Although the dial numeral 1 can be dialed to the finger stop 12 after having passed the protrusion B of the cam 16 and the raised portion A of the rotation sensing lever 11. However, as in the case of the dial numeral 0, the end C of the 0-check lever 19 is forced to abut against the cam 16 and when the protrusion B of the cam 16 is drawn to the counter-clockwise direction the hook portion J of the rotation sensing lever 15 is locked into the recessed portion of the cam 17 to check return movement of the cam 16 thereby preventing the dial plate 11 from returning to its original position and accordingly, no signal whatever is dispatched.

On the other hand, when the second dial numeral is any one of 2 to 9, the dial plate 11 can be operated without any obstruction as is clear from the foregoing description and as soon as it starts a return movement the stopper 13 pushes the raised portion A of the rotation sensing lever 15 and then moves the protrusion B of the cam 16 in the clockwise direction. In this case, the end C of the 0-check lever 19 is locked into the recessed portion of the cam 16 at a position in which the cam 16 is rotated in the full clockwise direction and the cam 16 continues to remain checked and at the same time the end D of the 0-check lever 19 moves in the clockwise direction thus allowing the stopper 13 to pass therethrough without obstruction.

Thus, any third dial numerals from 0 to 9 can be dialed to the finger stop 12 and the return movements thereof are not obstructed.

When the handset is placed down on the telephone, the connecting rod 22 is raised and the end E of the set lever 20, the end G of the rotaton sensing lever 15 and the hook lever 21 are raised by the hook portions F, H and K respectively, and at the same time, the end C of the 0-check lever 19 is disengaged from the recessed portion of the cam 16 to allow these members to return to their original position.

Figure 4:
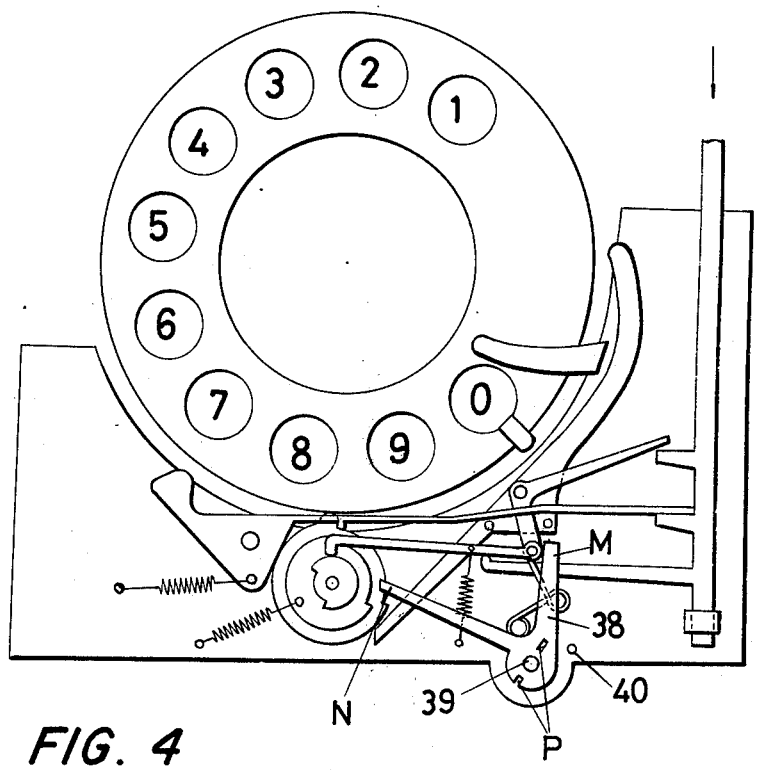
FIG. 4 illustrates the release mechanism of the present invention.
Figure 5:
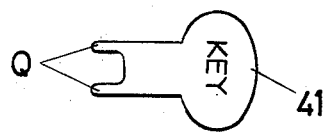
FIG. 5 illustrates a key used with the release mechanism of FIG. 4.

Lastly, to release the above mentioned checking mechanism, a release means, such as shown in FIGS. 4 and 5 may be provided such that with the use of a key with a key hole provided on a suitable portion of the base plate 14 the cam 16 is rotated clockwise and the end C of the 0-check lever 19 is locked into the recessed portion of the cam 16 to thereby release at any time the limiting device of the present invention. In FIGS. 4 and 5 the top Q of key 41 is inserted in guide holes P of the releasing plate 38, which rotates around the pin 39 mounted on base 14. The key 41 is rotated counter clockwise.

What I claim is:

1. A long distance telephone call limiting device for preventing the dialing of a long distance telephone number said device comprising:
   a. a telephone set;
   b. a stopper provided on the outer periphery of the finger hole of the dial numeral 0 of a telephone dial plate;
   c. first, second and third rotatable cam members spaced from said dial plate;
   d. an arch-shaped 0-check lever means, wherein one end thereof checks said stopper and the other end thereof engages with the first cam member of said cam members;
   e. a rotatable sensing lever means for sensing the rotation of the dial plate said sensing lever means including a hook portion for engaging the second cam member of said cam members;
   f. a hook lever means for engaging the third cam member of said cam members;
   g. set lever means pivotably and coaxially mounted with said 0-check lever means and connected to said hook lever means; and
   h. a connecting rod having a plurality of hook means for engaging said set lever means, said rotation sensing lever means and said hook lever means respectively said rod moving in response to the movement of a handset on and off the telephone, wherein the dialing of an 0 or 1 in either of the first two digits of a phone number prevents the dialing of the remainder of the number.

2. A long distance telephone call limiting device as claimed in claim 1 including a plurality of tension spring means coupled respectively to said check lever means, said sensing lever means, and said set lever means.

3. A long distance telephone call limiting device as claimed in claim 1 which is provided with a release means adopted to unlock the said limiting device.

4. A long distance telephone call limiting device for preventing the dialing of long distance telephone numbers said device comprising:
   a. a telephone set;
   b. stopper means mounted on the dial ring of said telephone set at the 0 position thereof;
   c. prevention means mounted on said telephone set, said prevention means being engaged by said stopper means upon the dialing of a 1 or 0 in either the first two digits of a telephone number, wherein said prevention means prevents the completion of the dialing of the telephone number upon said engagement with said stopper means; and
   d. resetting means for disengaging said stopper means and said prevention means upon the placement of the handset of said telephone in the craddle thereof.

* * * * *